United States Patent [19]

Schaffer, Jr. et al.

[11] Patent Number: 4,993,823
[45] Date of Patent: Feb. 19, 1991

[54] METHOD FOR CORRECTION OF DISTORTIONS OF AN IMAGING DEVICE

[75] Inventors: William E. Schaffer, Jr., Webster; Donald A. Jacques, Pittsford; Donald E. Vandenberg, Brockport, all of N.Y.

[73] Assignee: Eastman Kodak Company, Rochester, N.Y.

[21] Appl. No.: 374,332

[22] Filed: Jun. 29, 1989

[51] Int. Cl.$^5$ .............................................. G02B 7/18
[52] U.S. Cl. ................................................... 350/611
[58] Field of Search .......................................... 350/611

[56] References Cited

U.S. PATENT DOCUMENTS 4,875,764 10/1989 Marino et al. ........................ 350/611
4,875,765 10/1989 Vandenberg et al. ............... 350/611

OTHER PUBLICATIONS

Fuschetto, "Three-Actuator Deformable Water-Cooled Mirror", SPIE, vol. 179, 4/79, pp. 17-27.

Primary Examiner—Bruce Y. Arnold
Assistant Examiner—Rebecca D. Gass
Attorney, Agent, or Firm—Stephen C. Kaufman

[57] ABSTRACT

A method for providing corrections of distortions of an imaging device. Initial corrections may be provided through the use of active optics, to apply forces to the imaging device, or to a compensator device in a common optical path with the imaging device, so as to introduce deformations that cancel out the distortions. This action, in turn, may induce undesirable, secondary aberrations. The method of the invention provides steps for identifying, isolating and removing the undesirable secondary aberrations, and computing new applied forces that cannot induce the secondary aberrations.

10 Claims, 3 Drawing Sheets

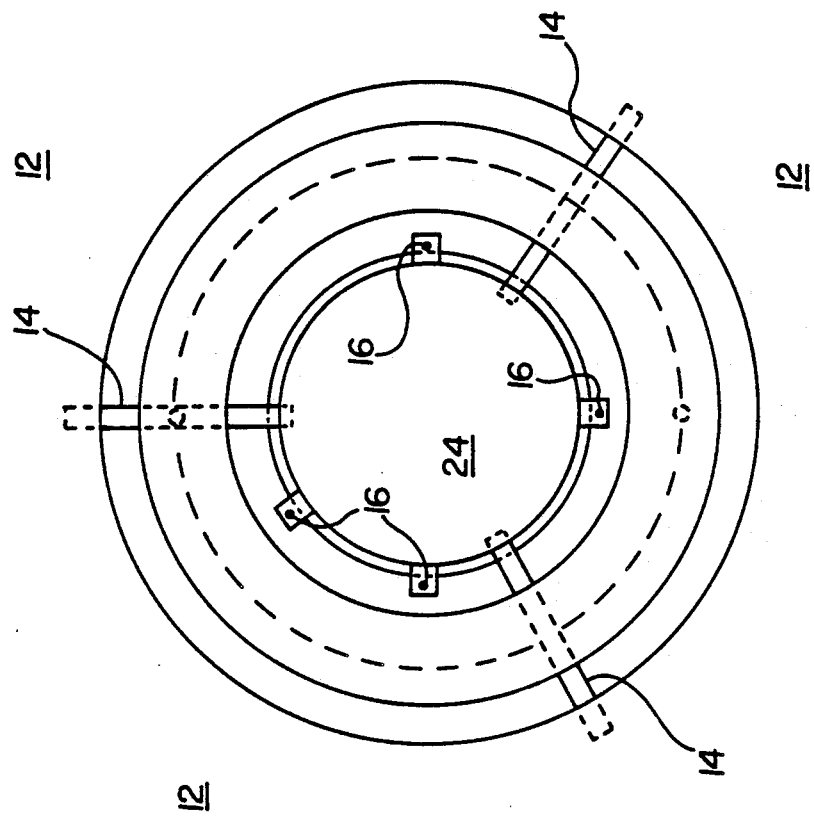
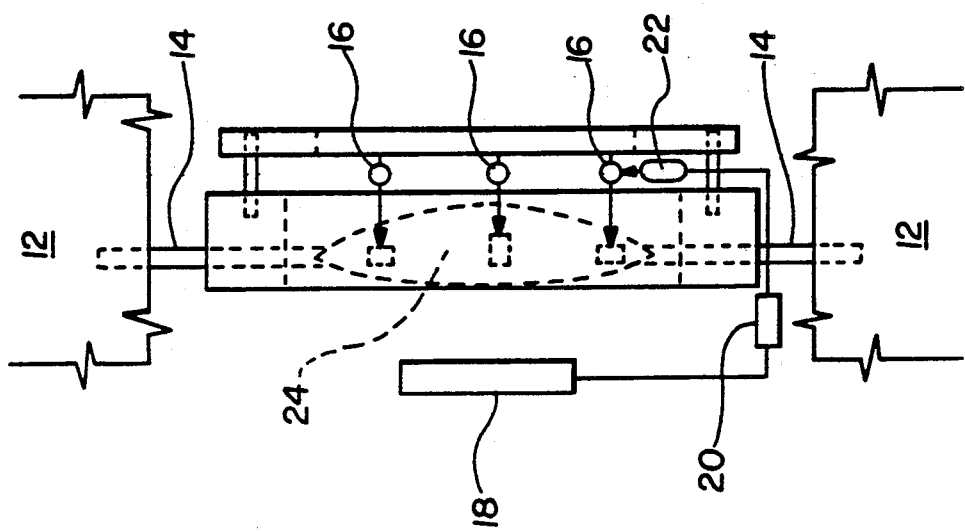
FIG. 2B
FIG. 2A

METHOD FOR CORRECTION OF DISTORTIONS OF AN IMAGING DEVICE

CROSS-REFERENCE TO RELATED APPLICATIONS

This application is related to Marino et al. U.S. patent application Ser. No. 225,901 filed July 29, 1988, and Vandenbert et al U.S. patent application Ser. No. 07/226,339, filed July 29, 1988. The entire disclosures of each of these applications are incorporated by reference herein. Each of these applications is copending and commonly assigned.

BACKGROUND OF THE INVENTION

1. Field of the Invention

This invention relates to a method that can provide corrections of distortions of an imaging device.

2. Introduction to the Invention

It is well known to employ an imaging device, for example, a lens, a diffraction grating, or a mirror, as an important component of an optical system, for example, a telescope. To this end, it is desirable that the surface accuracy of the imaging device realize an optimal optical quality. For example, it is desirable that the optical quality of the imaging device not be unduly compromised by imaging device shape distortions due to, e.g., thermal distortions, material inhomogeneities, stress relaxation, or errors in support forces.

One method of compensation for this possible fall off in optical quality is to apply forces to the imaging device, thus introducing deformations that cancel out the accumulated errors. This method is referred to as active optics. For instruction on active optics, reference may be made for example to R. N. Wilson, F. Franza and L. Noethe, "Active optics I: a system for optimizing the optical quality and reducing the costs of large telescopes", J. Modern Opt. 34(4) 485–509 (1987); J. H. Hardy, "Active optics—don't build a telescope without it!" in International Conference on Advanced Technology Optical Telescopes, G. Burbidge and L. D. Barr, eds., Proc. SPIE 332, 252–259 (1982); and F. B. Ray and T.-Y. Chunt, "Surface analysis of an actively controlled telescope primary mirror under static loads, "Appl. Opt." 24(4), 564–569 (1985). The disclosures of each of these references is incorporated by reference herein.

SUMMARY OF THE INVENTION

It has been proposed to use active optics in conjunction with the setup disclosed in Pearson et al., "Active optics correction of thermal distortion of a 1.8 meter mirror", Optical Engineering, Vol. 27, No. 2, (115–122), Feb. 1988. The Pearson et al. setup is shown in FIG. 1, and includes an imaging device comprising a mirror 10 that is supported from a base structure 12, by way of a plurality of position actuators 14. The setup further includes a plurality of force actuators 16, which can apply forces to the mirror 10 in accordance with the method of active optics disclosed above.

In one embodiment, the Pearson et al. setup gathers optical test information on the mirror 10 by way of a camera 18. The test information may be used as an input to a control system 20 on a quasi-real-time basis. The camera 18 and the control system 20 define a closed feedback loop 22 that closes around the camera 18 and the control system 20 i.e., it closes around a "sensing means." The control system 20 can determine a set of force commands to correct the predicted mirror 10 distortions, and input this information to the force actuators 16.

The work of Pearson et al. may be extended in the following way. First, it can be recognized that, while the Pearson et al. setup is useful, it may not provide optimal results and be entirely faithful to the goal of removing the distortions of the imaging device. This follows for the following reasons.

Pearson et al. determine a set of force commands by way of an evaluation of the classical and ideal Zernike polynomials. The Zernike polynomials are explained in the text Principles of Optics, Born and Wolf, Pergamon Press, 1965, Chapter 9. The Zernike polynomials are defined as orthogonal, and they may be mapped on a one to one basis with an infinity of possible "global" imaging device distortions. A "global" imaging device distortion is to be understood as a predominating, accumulative distortion manifest either by a single non-ideal imaging device or, an optical system comprising both ideal and non-ideal imaging device components. For example, the orthogonal (hence, independent) Zernike polynomials may be uniquely mapped on a one to one basis with a global imaging device distortion such as bias, tilt, power, coma, astigmatism, quatrefoil and trefoil, etc.

As stated, a crucial assumption in the ideal Zernike polynomial expansion is that the polynomials, hence the sundry imaging device distortions, are orthogonal or independent. Based on this assumption, the Pearson et al. setup purports to correct a first global imaging device distortion, say power, by using a first set of force commands, then, independently, attempting to correct a second global imaging device distortion, say coma, by using a second set of force commands. This scheme may be continued indefinitely through a desired list of global imaging device distortions to be corrected.

It has been shown, so far, that the success of the Pearson et al. setup in removing a global imaging device distortion, may be tied to its successful employment of the ideal Zernike polynomial. We have recognized, however, that the Zernike polynomial is couched within an ideal, textbook world, and that in the real-work-a-day-world of our optical systems, including the FIG. 1 setup, it may be very difficult or impossible to replicate the constraints or boundary conditions, etc., which are pre-supposed by the ideal Zernike polynomial. For this important situation, the ideal Zernike assumption of an invariant orthogonality may fall by the wayside. This, in turn, may result in a first set of force commands, which purport to correct for a primary global distortion, say power, inducing spurious and undesired secondary distortions, for example, coma and astigmatism. It is clear that if the induced, undesired distortions are significant, the goal of removing any distortions from the imaging device may be frustrated.

The present invention addresses and provides a solution to this problem. In one aspect, the invention provides a method for providing corrections of imaging device aberrations, the method comprising the steps of:

(a) applying a first force matrix $[F_W]$ to the imaging device for introducing first deformations that act to cancel out a global imaging device aberration;

(b) forming a non-singular correction matrix CM comprising at least one column vector, wherein a column vector is dedicated to the global imaging device aberration and includes at least one matrix element that carries information on the global imaging device aberration, and at least one matrix element that carries information on undesired imaging device aberrations induced by applying the first force matrix [F$_W$];

(c) forming a participation factor [PF] matrix by inverting the correction matrix, for eliminating the undesired imaging device aberrations; and (d) generating a product matrix [PF]. [F$_W$]=[F$_W$]', for producing a second force matrix [F$_W$]' for applying to the imaging device second deformations.

In a second aspect, the present invention provides a method for providing corrections of deviations in an optical assembly, which optical assembly comprises:

1. an imaging device; and
2. a compensator device in operative association with the imaging device and located in a common optical path with the imaging device; the method comprising the steps of:

(a) applying a first force matrix [F$_W$] to the compensator device for introducing first deformations that act to cancel out a global imaging device aberration;

(b) forming a non-singular correction matrix CM comprising at least one column vector, wherein a column vector is dedicated to the global imaging device aberration and includes at least one matrix element that carries information on the global imaging device aberrations, and at least one matrix element that carries information on undesired imaging device aberrations induced by applying the first force matrix [F$_W$];

(c) forming a participation factor [PF] matrix by inverting the correction matrix, for eliminating the undesired aberrations; and (d) generating a product matrix [PF]. [F$_W$]=[F$_W$]', for producing a second force matrix [F$_W$]', for applying to the compensator device second deformations.

This aspect of the present invention requires the compensator device in operative association with the imaging device, as defined, for the following reasons and advantages. In many practical optical assemblies, advantages of ease of installation and efficiencies, may be realized by correcting the imaging device deviations, by way of the compensator device. For example, the compensator device may be smaller and more wieldly than the imaging device, and it may be located where it is more practical to situate a force actuator.

BRIEF DESCRIPTION OF THE DRAWINGS

The invention is illustrated in the accompanying drawings in which:

FIGS. 2A, B show an alternative active optics setup; and

DETAILED DESCRIPTION OF THE INVENTION

Figure 1:
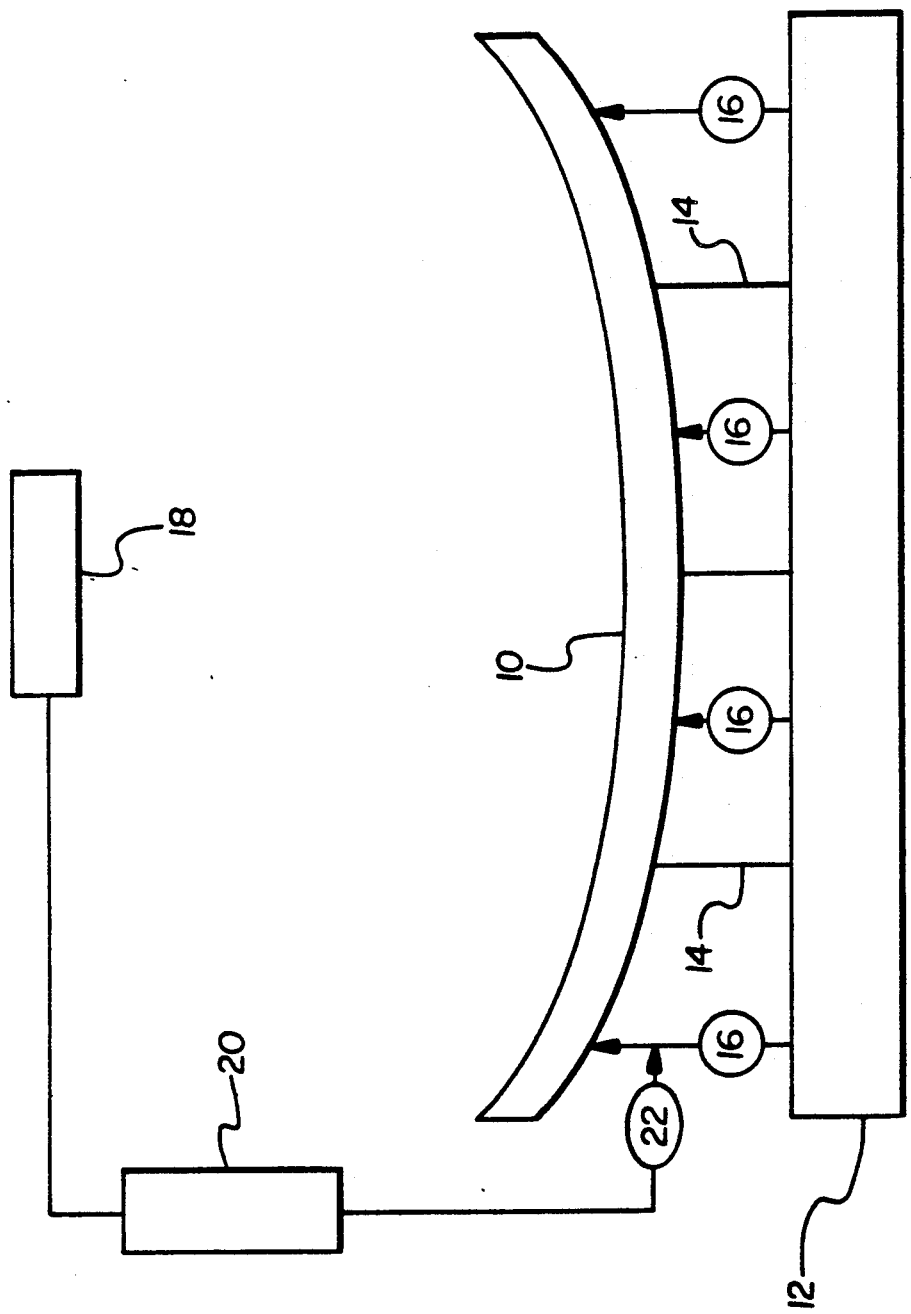
FIG. 1 shows an active optics setup.

Attention is now directed to FIGS. 2A, B (edge, front views respectively), which provide a suitable framework for one aspect of the present invention. FIGS. 2a, 2b are similar to FIG. 1, with the exception that an imaging device comprising a lens 24 has been substituted for the mirror 10 of FIG. 1. FIGS. 2A, B accordingly, show the imaging device comprising the lens 24, that is supported from the base structure 12, by way of the plurality of position actuators 14. Also shown are the plurality of force actuators 16 which can apply forces to the lens 24, in accordance with the method of active optics disclosed above.

A preferred assembly that optimally realizes the method of active optics, to be applied in conjunction with the FIG. 2 set up, is disclosed in the copending and commonly assigned U.S. patent application Ser. No. 225,901 incorporated by reference herein. This preferred assembly features a force actuator which comprises a closed feedback loop that closes around the force actuator, and that can maintain a desired controlled force for application to the lens 24.

Continuing, the force actuators 16 apply forces to the lens 24, to the end of introducing deformations that act to cancel out a global lens aberration. Examples of such global lens aberrations include bias, tilt, power, coma, astigmatism, quatrefoil and trefoil.

Assume, now, that the force actuators 16 apply forces to the lens 24 to cancel out one of these global aberrations, for example, the power aberration. A force matrix to provide this capability may be given by $$F_1 = \begin{bmatrix} f_{P1} \\ f_{P2} \\ \cdot \\ \cdot \\ \cdot \\ f_{Pn} \end{bmatrix} n \times 1$$

F$_1$ is an (n×1) matrix that is dedicated to canceling out the power (P) aberration. Each element in the F$_1$ matrix represents a force f$_{pn}$ that may be applied locally to the lens 24, by one of the n force actuators 16, in order to cancel out the global lens power aberration.

As further examples of using the force actuators 16 to apply forces to the lens 24 to cancel out aberrations, we now develop the following matrices F$_2$, F$_3$, F$_4$ which can act individually to cancel out the global aberrations coma (C), astigmatism (A) and quatrefoil (Q), respectively:

$$F_2 = \begin{bmatrix} f_{C1} \\ f_{C2}; \\ \cdot \\ \cdot \\ \cdot \\ f_{Cn} \quad n \times 1 \end{bmatrix} \quad F_3 = \begin{bmatrix} f_{A1} \\ f_{A2}; \\ \cdot \\ \cdot \\ \cdot \\ f_{An} \quad n \times 1 \end{bmatrix} \quad F_4 = \begin{bmatrix} f_{Q1} \\ F_{Q2} \\ \cdot \\ \cdot \\ \cdot \\ F_{Qn} \end{bmatrix} n \times 1.$$

The matrices F$_2$, F$_3$, and F$_4$, like F$_1$, are (n×1) matrices. Each element in the matrix represents a force that may be applied locally to the lens 24 by one of the n force actuators 16, in order to cancel out the indicated global lens aberration. Note that other matrices F$_5$, F$_6$, ... F$_W$ may be developed in a similar way, to cancel out other global aberrations, like bias or trefoil, for example.

We have recognized that when a selected first force matrix F$_W$ is applied to the lens 24 to cancel out a primary or "desired" global lens aberration, further unwanted or undesired, secondary lens aberrations may result. This may occur, as discussed above, when it is not possible to realize the ideal Zernike assumption of an invariant orthogonality between the force matrices F$_W$. For example, assume that the force matrix F$_3$ is selected in order to cancel out the global astigmatism aberration. This primary action may induce in the lens 24 further undesired, secondary aberrations, like power, coma and quatrefoil. In the same way, for example, we have found that when the force matrix $F_1$ is selected in order to cancel out the lens 24 global power aberration, the indicated primary action may induce in the lens 24 the undesired, secondary aberrations of coma, astigmatism and quatrefoil.

We generalize this situation by defining the following matrices $A_1$, $A_2$, $A_3$ and $A_4$:

Power
$$A_1 = \begin{bmatrix} P \\ c \\ a \\ q \end{bmatrix};$$

Coma
$$A_2 = \begin{bmatrix} p \\ C \\ a \\ q \end{bmatrix};$$

Astigmatism
$$A_3 = \begin{bmatrix} p \\ c \\ A \\ q \end{bmatrix};$$

Quatrefoil
$$A_4 = \begin{bmatrix} p \\ c \\ a \\ Q \end{bmatrix}.$$

Each of the matrices $A_1$, $A_2$, $A_3$ and $A_4$ is dedicated to one of the global lens 24 aberrations we primarily desire to cancel out, for example, power, coma, astigmatism and quatrefoil. Each of the matrices is a (4×1) matrix. Each element of each matrix is designated by either a capital letter or a lowercase letter. The capital letter indicates the primary lens aberration we desire to cancel out, while the lower case letter indicates the undesired lens aberration that may be secondarily induced by the primary action. For example, the matrix $A_4$ is dedicated to the global lens aberration called quatrefoil. The elements of the matrix $A_4$ comprise undesired, secondary lens aberrations (lowercase) power (p), coma (c), astigmatism (a), as well as the desired aberration (capitalized) quatrefoil (Q).

Note that other matrices $A_5$, $A_6$ ... $A_W$ may be developed in a similar way, each such matrix being dedicated to one of the myriad global lens aberrations. Note further that in this process, the matrices are incrementally sized, so e.g., $A_5$ is a (5×1) matrix, and $A_8$ is an (8×1) matrix, etc.

Continuing, an important step of the method of the invention, as summarized above, is to remove the unwanted, undesired, secondary or residual aberrations. This step may be accomplished by way of first forming a non-singular correction matrix (CM), as follows:

$$[CM] = \begin{bmatrix} A_{1P} & A_{2p} & A_{3p} & A_{4p} \\ A_{1c} & A_{2C} & A_{3c} & A_{4c} \\ A_{1a} & A_{2a} & A_{3A} & A_{4a} \\ A_{1q} & A_{2q} & A_{3q} & A_{4Q} \end{bmatrix} 4 \times 4$$

The correction matrix [CM] represents a re-formating of the matrices $A_1$, $A_2$, $A_3$ and $A_4$. A column vector of the correction matrix, accordingly, is dedicated to one of the global aberrations, like power or coma, etc. Each element in a column vector is either capitalized or lowercased, thus indicating, as before, a "desired" aberration or an "undesired" secondary aberration. For example, the second column vector of the correction matrix is dedicated to the global aberration coma, and comprises vector elements $A_{2p}$, $A_{2a}$, $A_{2q}$ which are undesired, secondary aberrations (lowercased), and a vector element $A_{2C}$ which is a desired aberration (capitalized). Note that the correction matrix may be developed, that is, expanded, in a routine manner to accommodate the matrices $A_5$, $A_6$, ... $A_W$. In this process, the correction matrix simply adds the desired vector $A_W$ as an additional column. It is observed, therefore, that the correction matrix is always a square matrix.

The correction matrix [CM] thus formed provides a ready vehicle to the end of removing the undesired, secondary aberrations from the desired aberrations. The correction matrix, it may be observed, sets out the desired aberrations along the diagonal, namely the matrix elements $A_{1P}$, $A_{2C}$, $A_{3A}$, $A_{4Q}$. All of the undesired, secondary aberrations, on the other hand, are off-diagonal elements. Removing the undesired aberrations, in turn, is mathematically equivalent to first inverting the correction matrix [CM], thus forming a new matrix $[CM]^{-1}$, and then forming the matrix identity product $[CM] \cdot [CM]^{-1} = [I]$. By definition, the matrix identity product is a mathematical statement that all of the off-diagonal elements, i.e., the undesired aberrations, are equal to zero. At the same time, the diagonal elements, i.e., the desired aberrations, have a finite value. And this is of course what is wanted at this step of the method.

Note that the inverted correction matrix $[CM]^{-1}$ may be formed by mathematically dividing the adjoint matrix of [CM] by the determinant of [CM]. That is, $$[CM]^{-1} = \frac{\text{Adjoint of Correction Matrix}}{\text{Determinant of Correction Matrix}},$$

with the proviso that the determinant of the correction matrix is not equal to zero. The indicated inversion technique is explained, for example, in the reference Advanced Engineering Mathematics, Kreyszig, John Wiley and Sons, 1967, Chapter 7.

The inverted correction matrix $[CM]^{-1}$ has the following form:

$$[CM]^{-1} = \begin{bmatrix} A'_{1P} & A'_{2p} & A'_{3p} & A'_{4p} \\ A'_{1c} & A'_{2C} & A'_{3c} & A'_{4c} \\ A'_{1a} & A'_{2a} & A'_{3A} & A'_{4a} \\ A'_{1q} & A'_{2q} & A'_{3q} & A'_{4Q} \end{bmatrix}$$

The inverse correction matrix $[CM]^{-1}$ exists if, and only if, the correction matrix [CM] is non-singular and square. This condition of existence is assured by our stipulation that the correction matrix is sized by the number of desired and undesired aberrations. In other words, the correction matrix [CM], culled from the matrices $A_1$ ... $A_W$, is always a square correction matrix. Further, the inverse of the correction matrix [CM] is unique. That is, the inverse matrix $[CM]^{-1}$ is a vehicle by means of which an optimal lens 24 aberration correction may be obtained.

A review of our discussion is now in order. We stated above that, when a selected first force matrix $[F_W]$ is applied to the lens 24 to cancel out a primary or "desired" global lens aberration, further unwanted or undesired, secondary lens aberrations may be induced by this action. We attacked this situation by (1) defining the $A_W$ matrices, which matrices account for these undesired aberrations; (2) organizing the $A_W$ matrices into the correction matrix [CM]; and (3) demonstrating that the undesired aberrations could be removed by way of the inversion matrix $[CM]^{-1}$. What is required at this stage, therefore, is to go back to the original first force matrix $F_W$ and reevaluate its contents, with a view to providing a second force matrix $[F_W]'$ that cannot induce the undesired lens aberrations.

This last step of providing a second force matrix $[F_W]'$ is done by way of defining a participation factor [PF] matrix, where $$[PF] = [CM]^{-1}[I] = [CM]^{-1}.$$

The participation factor [PF] matrix represents scalar multipliers. The scalar multipliers, when applied to the first force matrix $[F_W]$, generate a product force matrix $[F_W]'$ that cannot induce the undesired lens aberrations. The product force matrix $[F_W]'$ is the required second force matrix. This statement may be expressed mathematically as $$[F_W]' = [PF] \cdot [F_W].$$

We conclude this section by noting that the method of the invention generates a sequence of force matrices, namely, $[F_W] \rightarrow [F_W]'$. We have recognized that the $[F_W]$ matrix element values may be based on an ideal force computation evaluation, and that it may not be possible in practice to realize, by way of the actual hardware model of FIG. 2, the ideal force computations used in the sequence generation. The method of the invention, however, can accommodate this possible fall off in ideal force computation realization, in the following manner. A second correction matrix [CM]* may be formed from the second force matrix $[F_W]'$. The second correction matrix [CM]* comprises matrix element which are actual test data or test results. The second correction matrix may be formed in a manner entirely analogous to that taught above for forming the correction matrix [CM]. Next, again analogously to that taught above, a second participation factor matrix [PF]* may be formed, by inverting the second correction matrix [CM]* and multiplying it by the identity matrix viz.:

$$[PF]^* = [CM]^{*-1}[I].$$

Finally, a desired third force matrix $[F_W]''$ may be defined as $$[F_W]'' = [PF][F_W]'.$$

Note that the third force matrix $[F_W]''$ eliminates the effects due to particular hardware tolerance deviations, or ideal force computation uncertainties.

Figure 3:
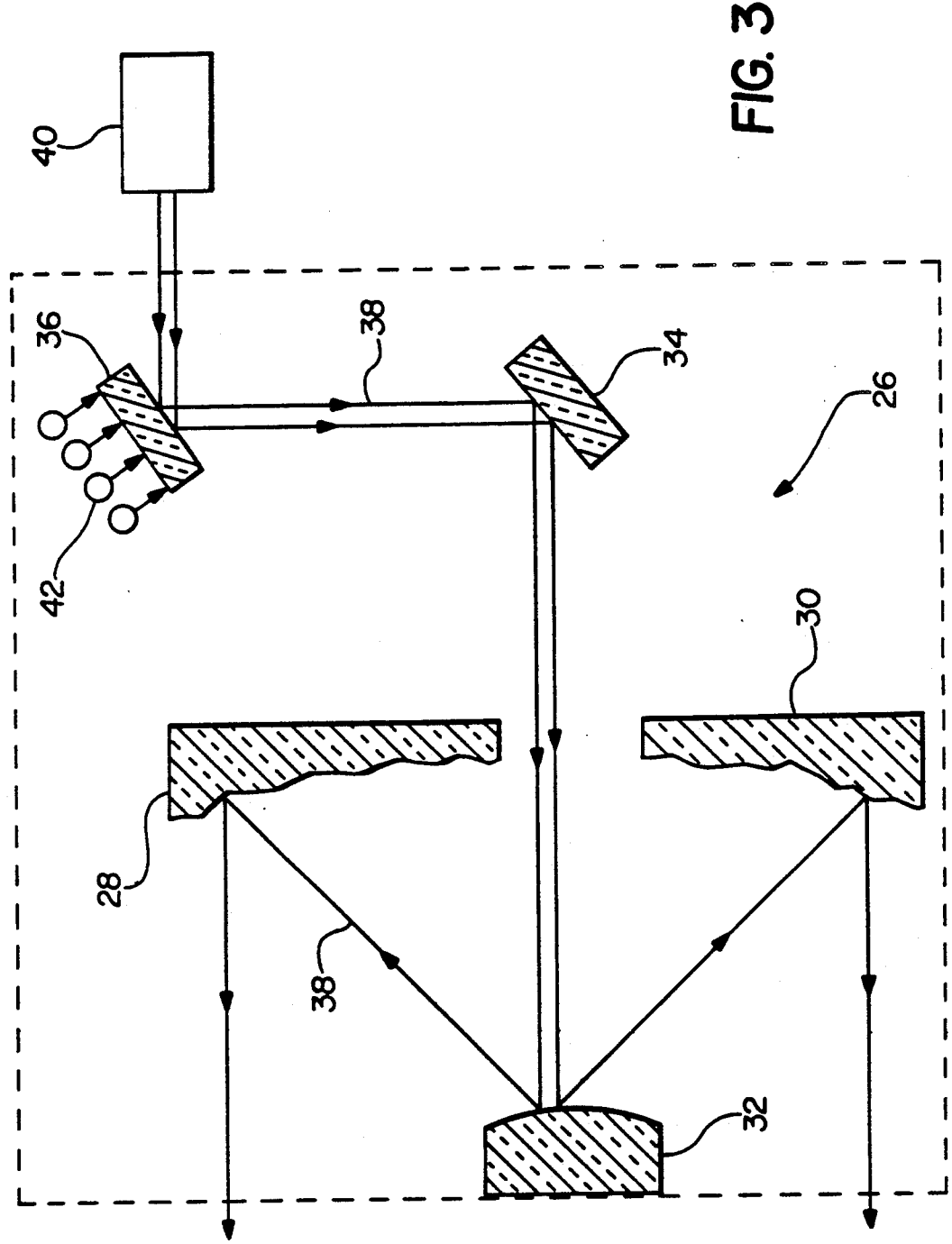
FIG. 3 shows an alternative embodiment of the present invention.

Attention is now directed to FIG. 3, which shows an alternative embodiment of the present invention. In particular, FIG. 3 shows an optical assembly 26 suitable for use in a telescope. The optical assembly 26 comprises a pair of imaging devices 28, 30 comprising primary mirrors; a pair of auxiliary imaging devices 32, 34 comprising folding path mirrors; a compensator device 36 comprising a conventional mirror in operative association with the imaging devices 28, 30, and located in a common optical path 38, as defined in conjunction with a source of radiation 40; and a set of force actuators 42, each of which force actuators can apply a force matrix $[F_W]_{CD}$ to the compensator device (CD) 36.

In accordance with this embodiment of the present invention, it is required to cancel out a global imaging device 28 aberration, say quatrefoil (Q). This may be effected by way of applying the force actuators 42 to the compensator device 36. In particular, this requires the steps of:

(a) applying a first force matrix $[F_W]_{CD}$ to the compensator device 36 for introducing first deformations that act to cancel out a global imaging device 28 quatrefoil aberration. Note that the force matrix $[F_W]_{CD}$ may not necessarily be equal to the force matrix $[F_W]$ specified above (as applied directly to the imaging device 28). In general, however, the force matrix $[F_W]_{CD}$ is directly proportional to the force matrix $[F_W]$, that is $$[F_W]_{CD} = K[F_W],$$

where the proportionality constant K is specified by the property differences, for example, a relative stiffness factor, between the imaging device 28 and the compensator device 36;

(b) forming a non-singular correction matrix CM comprising at least one column vector, wherein a column vector is dedicated to the global imaging device 28 quatrefoil aberration, and includes at least one matrix element that carries information on the global imaging device aberration, and at least one matrix element that carries information on undesired imaging device 28 aberrations induced by applying the first force matrix $[F_W]_{CD}$;

(c) forming a participation factor [PF] matrix by inverting the correction matrix, for eliminating the undesired aberrations; and (d) generating a product matrix [PF]. $[F_W]_{CD} = [F_W]_{CD}$ for producing a second force matrix $[F_W]'_{CD}$ for applying to the compensator device 36 second deformations.

What is claimed is:

1. A method for providing corrections of deviations in an optical assembly, which optical assembly comprises:

(1) an imaging device selected from the group consisting of a mirror, a lens and a diffraction grating;

(2) an auxiliary compensator device located in a common optical path with the imaging device and in a conjugate optical position to the imaging device; and (3) at least one force actuator for acting upon at least one of the imaging device and auxiliary compensator device;

the method comprising the steps of:

a. applying a first force matrix $(F_W)$ by way of the or each force actuator to the compensator device for introducing first deformations that act to cancel out a global imaging device Zernike aberration;

b. forming a non-singular correction matrix CM comprising at least one column vector, wherein a column vector is dedicated to the global imaging device Zernike aberration and includes at least one matrix element that carries information on undesired imaging device aberrations induced by applying the first force matrix (F$_W$);

c. forming a participation factor (PF) matrix by inverting the correction matrix, for eliminating the undesired aberrations; and d. generating a product matrix (PF)·(F$_W$)=(F$_W$)′, for producing a second force matrix (F$_W$)′ for applying by way of the or each force actuator to the compensator device second deformations.

2. A method according to claim 1, wherein the first force matrix (F$_W$) comprises a plurality of force vectors, each of which force vectors is applied to a predetermined compensator device location by the or each force actuator.

3. A method according to claim 1, wherein the first force matrix [F$_W$] comprises a plurality of force vectors, each of which force vectors is computed in accordance with the terms of a Zernike polynomial in order to cancel out a selected global imaging device aberration.

4. A method according to claim 3, wherein the selected global imaging device aberration includes one of at least power, coma, astigmatism and quatrefoil.

5. A method according to claim 1, wherein the participation factor [PF] matrix is mathematically defined as:

$$[PF] = [CM]^{-1} = \frac{\text{Adjoint of Correction Matrix}}{\text{Determinant of Correction Matrix}}.$$

with the proviso that the determinant of the correction matrix is not equal to zero.

6. A method according to claim 1, further comprising the steps of:

(e) forming a second correction matrix [CM]* based on the second force matrix [F$_W$]′;

(f) forming a second participation factor [P$_F$]* matrix by inverting the second correction matrix [CM]*, for eliminating the effects of ideal force computation assumptions; and (g) generating a second product matrix [PF]*·[F$_W$]′=[F$_W$]″, for producing a third force matrix [F$_W$]″ for applying to the compensator device.

7. A method according to claim 1, wherein the imaging device comprises a mirror.

8. A method according to claim 7, wherein the compensator device comprises a mirror.

9. A method according to claim 1, wherein the imaging device comprises a lens.

10. A method according to claim 9, wherein the compensator device comprises a lens.

* * * * *